(No Model.)
C. P. SUTTON.
CULTIVATOR.
No. 490,322. Patented Jan. 24, 1893.
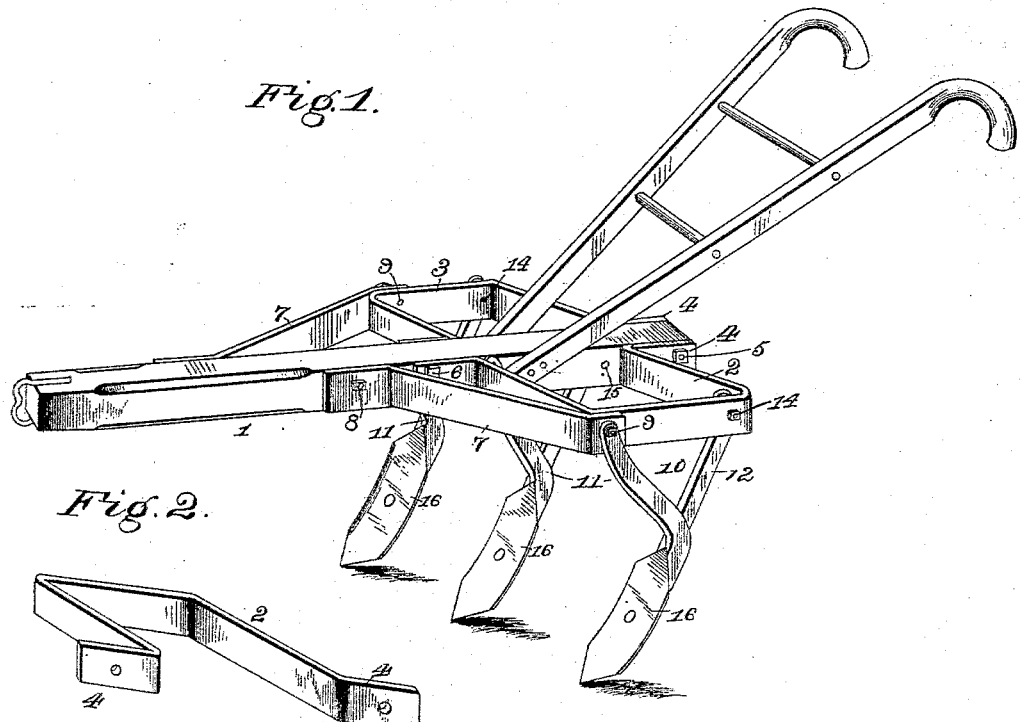
Fig. 1.
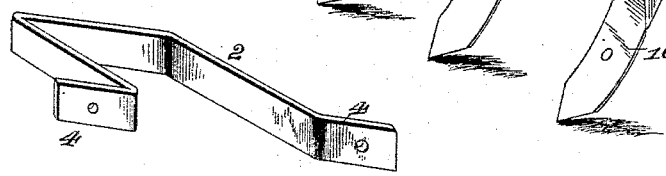
Fig. 2.
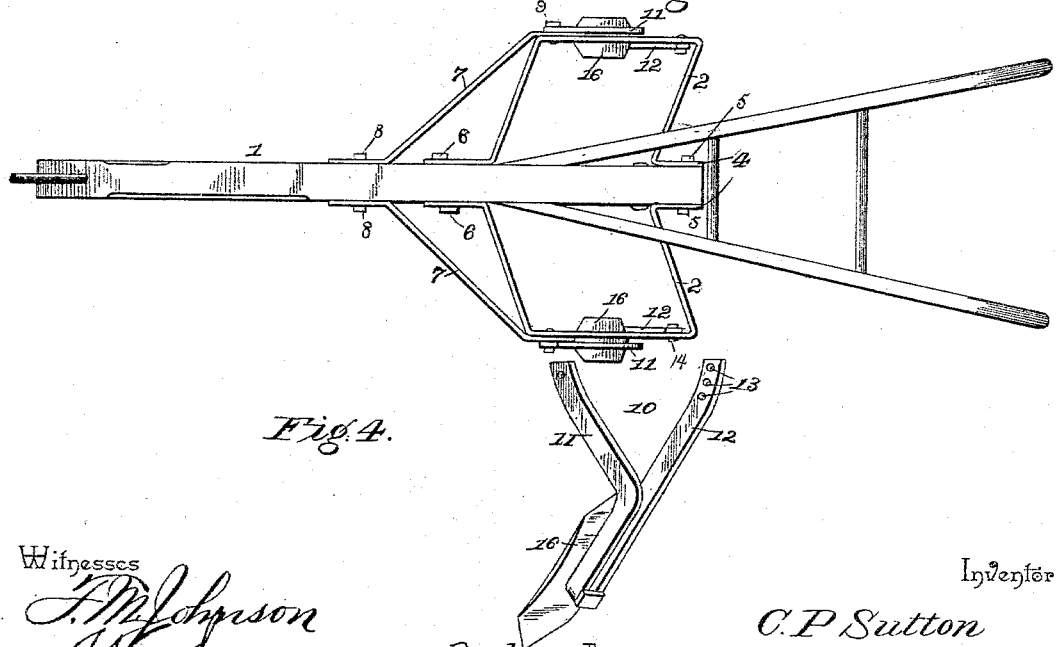
Fig. 3.
Fig. 4.
Witnesses
F. M. Johnson
J. R. Liggers
Inventor
C. P. Sutton
By his Attorneys,
C. A. Snow & Co.

UNITED STATES PATENT OFFICE.

COLUMBUS P. SUTTON, OF NASHVILLE, ARKANSAS.

CULTIVATOR.

SPECIFICATION forming part of Letters Patent No. 490,322, dated January 24, 1893.

Application filed March 31, 1892. Serial No. 427,268. (No model.)

*To all whom it may concern:*

Be it known that I, COLUMBUS P. SUTTON, a citizen of the United States, residing at Nashville, in the county of Howard and State of Arkansas, have invented a new and useful Cultivator, of which the following is a specification.

My invention relates to improvements in cultivators; and the objects in view are to provide a cultivator of cheap and simple construction, adapted to serve either as a gang cultivator or as a single plow; and the parts of which are capable of being so arranged and interchanged as to convert the same to either a right or left-hand cultivator, as may be desired.

Other objects and advantages of the invention will appear in the following description; and the novel features thereof will be particularly pointed out in the claims.

Referring to the drawings:—Figure 1 is a perspective of a cultivator constructed in accordance with my invention, the same being shown in gang form, and adapted to throw the dirt to the left. Fig. 2 is a detail in perspective of one of the side-frames. Fig. 3 is a plan view of the cultivator, the same being arranged in what is usually termed "butterfly" form. Fig. 4 is a detail in perspective of one of the cultivator-standards.

Like numerals of reference indicate like parts in all the figures of the drawings.

1 designates the beam, which is of any ordinary construction, and may be constructed expressly as a part of my invention, or adapted to receive my invention, as would be the case where the invention was applied to any plow now in existence. From the beam rise the usual handles. At opposite sides of the beam, rectangular or diamond-shaped frames 2 and 3 are located. These frames, as before stated, are substantially diamond-shaped, and each terminates in laterally-bent perforated securing-ears 4, adapted to lie at opposite sides of the beam. These frames are constructed preferably of strap or bar-iron, of sufficient strength and rigidity, and as will be obvious, when applied to the opposite sides of the beam, may be turned in various ways, so that they will each be disposed to the rear to form what might be termed a "butterfly" cultivator, as shown in Fig. 3, and they may be arranged to form either a left or a right hand cultivator, the former being shown in Fig. 1. Through the securing-ears of the frames transverse bolts 5 and 6 are passed, whereby the frames are removably secured to the beam. To the front outer corners of each frame a brace 7 is bolted as at 8, the forward ends of the two braces being secured by independent bolts 9, in advance of each other to the beam 1. It will be obvious that in changing the frames so as to form right or left or butterfly cultivators, the braces likewise change position, and their bolts take into holes formed at convenient points in the beam 1.

10 designates a series of three bifurcated cultivator-standards, each standard comprising a forwardly-inclined branch 11, and a rearwardly inclined branch 12. The former branches of the two outer standards are connected by the bolts 8, to the longitudinal portions of the two frames 2 and 3, while the rear branches are provided with a series of perforations or adjusting-holes 13, through which bolts 14 are passed, into the outer rear corners of the frames. The central standard has its branches connected by bolts 15 to the beam 1. Each of these standards has bolted to it an ordinary cultivator-shovel 16.

From the foregoing description, in connection with the accompanying drawings, it will be seen that I have provided a cultivator attachment for plows, whereby a single plow may be converted to a right or left hand cultivator, or to a butterfly cultivator, such conversion being accomplished in a short space of time, and with the use of simply a wrench, for removing the taps of the bolts. It will be seen that the attachment is very strong and light, being formed of strap-metal, suitably braced and disposed to withstand the strain.

Having described my invention, what I claim is:—

1. The combination with the main beam, having a cultivator, of the opposite reversible and invertible substantially diamond-shaped frames removably bolted to the opposite sides of the beam and provided at their outer sides with bolt openings, and cultivator standards removably bolted to said frames, substantially as specified.

2. The combination with the cultivator-beam having the depending-standard, of the opposite reversible diamond-shaped frames terminating in laterally-bent securing ears, bifurcated standards having diverging branches connected to the front and rear corners of their respective frames, and the opposite braces removably bolted at their front ends to the opposite sides of the beam, and at their rear ends to the front corners of the frames and front branches of the standards, substantially as specified.

In testimony that I claim the foregoing as my own I have hereto affixed my signature in the presence of two witnesses.

COLUMBUS P. SUTTON.

Witnesses:
D. B. LAIN,
J. E. SMITH.